US010086330B2

(12) United States Patent
Swensen et al.

(10) Patent No.: US 10,086,330 B2
(45) Date of Patent: Oct. 2, 2018

(54) COMBUSTION GAS REMOVAL FROM FLUE GAS USING COAL DERIVED MINERAL MATTER

(71) Applicant: Earth Technologies USA Limited, Santa Barbara, CA (US)

(72) Inventors: James S. Swensen, Santa Barbara, CA (US); Douglas E. Grunder, Mt. Vernon, IA (US); Simon K. Hodson, Santa Barbara, CA (US)

(73) Assignee: OMNIS MINERAL TECHNOLOGIES, LLC, Santa Barbara, CA (US)

( * ) Notice: Subject to any disclaimer, the term of this patent is extended or adjusted under 35 U.S.C. 154(b) by 0 days.

(21) Appl. No.: 15/400,575

(22) Filed: Jan. 6, 2017

(65) Prior Publication Data

US 2017/0197177 A1    Jul. 13, 2017

Related U.S. Application Data

(60) Provisional application No. 62/276,732, filed on Jan. 8, 2016.

(51) Int. Cl.
| | |
|---|---|
| *B01D 53/50* | (2006.01) |
| *B01D 53/56* | (2006.01) |
| *B01D 53/62* | (2006.01) |
| *B01D 53/78* | (2006.01) |
| *B01D 53/80* | (2006.01) |
| *C10L 5/02* | (2006.01) |
| *C10L 5/04* | (2006.01) |

(52) U.S. Cl.
CPC ........... *B01D 53/80* (2013.01); *B01D 53/507* (2013.01); *B01D 53/56* (2013.01); *B01D 53/62* (2013.01); *B01D 2257/502* (2013.01); *B01D 2258/0283* (2013.01)

(58) Field of Classification Search
CPC ...... B01D 53/502; B01D 53/56; B01D 53/62; B01D 53/78; B01D 53/80; B01D 2252/00; B01D 2252/10; B01D 2253/10; B01D 2258/0283; B01D 2259/126; C10L 5/02; C10L 5/04; C10L 2230/02; C10L 2230/088

See application file for complete search history.

(56) References Cited

U.S. PATENT DOCUMENTS 5,560,894 A * 10/1996 Ueno ................... B01D 53/502
423/239.1

FOREIGN PATENT DOCUMENTS

| CZ | 289749 B6 * | 3/2002 | ........... B01D 53/502 |
| DE | 43 03 842 A1 * | 2/1994 | ............... A62D 3/00 |
| EP | 0 152 682 A1 * | 8/1985 | ............. B01D 53/34 |
| EP | 0 496 432 A1 * | 7/1992 | ............. B01D 53/34 |
| JP | 2004261658 A * | 9/2004 | ............. B01D 53/62 |
| KR | 100288993 B1 * | 4/2001 | ........... B01D 53/501 |

* cited by examiner

*Primary Examiner* — Timothy C Vanoy

(74) *Attorney, Agent, or Firm* — Kirton McConkie; Evan R. Witt

(57) ABSTRACT

Coal-derived mineral matter is used to capture or remove combustion gas emissions from flue gas or exhaust gas. The coal-derived mineral matter may be obtained by separating it from coal particles, such as by use of a flotation separation process. Coal-derived mineral matter may also be present in fine coal refuse. In the method of removing combustion gas emissions from flue gas, an aqueous suspension of coal-derived mineral matter particles is contacted with the combustion gas emissions for sufficient time to cause the combustion gas emissions to react with the aqueous suspension and form an enhanced aqueous suspension. The combustion gas emissions may comprise NOx, SOx, CO, or mixtures thereof. An aqueous suspension of coal-derived mineral matter particles containing enhanced amounts of soluble and insoluble sulfate, sulfite, nitrate, nitrite, or carbonate reaction compounds formed by reaction of the aqueous suspension of the coal-derived mineral matter particles with combustion gas emissions.

20 Claims, 3 Drawing Sheets

COMBUSTION GAS REMOVAL FROM FLUE GAS USING COAL DERIVED MINERAL MATTER

CROSS-REFERENCE TO RELATED APPLICATIONS

This application claims the benefit of U.S. Provisional Patent Application No. 62/276,732, filed Jan. 8, 2016, titled COMBUSTION GAS REMOVAL FROM FLUE GAS USING COAL DERIVED MINERAL MATTER, which application is incorporated by reference.

FIELD OF THE INVENTION

This disclosure relates to the use of coal-derived mineral matter or fine coal refuse that contains coal derived mineral matter to capture or remove combustion gas emissions from flue gas or exhaust gas.

BACKGROUND

Flue gas or exhaust gas is the gas mixture produced during the burning or combustion of fossil fuels, e.g. coal, oil, gasoline, diesel, natural gas, propane, etc. Combustion gas emissions are specific gas molecular compounds produced during combustion that combined together create the mixture that is flue gas. Non-limiting examples of combustion gas emissions include $CO_2$, CO, $NO_2$, NO, NOx, $SO_2$, SO, $H_2O$, etc. The term NOx commonly refers to mixtures of $NO_2$ and NO. NOx is an undesirable combustion gas emission. The term SOx refers to one or more of a variety of sulfur oxide compounds such as lower sulfur oxides $S_nO$, $S_2O$, SO, $S_2O_2$, $S_7O_2$, $S_6O_2$, $SO_2$, and higher sulfur oxides such as $SO_3$, and $SO_4$. SOx is an undesirable combustion gas emission.

There is a need in the art for methods to reduce or eliminate combustion gas emissions from flue gas or exhaust gas.

BRIEF SUMMARY

Coal-derived mineral matter may be used to capture or remove combustion gas emissions from flue gas or exhaust gas. The coal-derived mineral matter may be obtained by separating it from coal particles, such as by use of a flotation separation process. Coal-derived mineral matter may also be present in fine coal refuse.

A method of removing combustion gas emissions from flue gas is disclosed in which an aqueous suspension of coal-derived mineral matter particles is contacted with the combustion gas emissions for sufficient time to cause the combustion gas emissions to react with the aqueous suspension and form an enhanced aqueous suspension.

The combustion gas emissions may comprise NOx, SOx, CO, or mixtures thereof. The NOx, SOx, CO, or mixtures react with the aqueous suspension to produce soluble and insoluble sulfates, sulfites, nitrates, nitrites, or carbonates in the aqueous suspension. As used herein, the aqueous suspension is "enhanced" when it contains an increased amount of soluble and insoluble sulfates, sulfites, nitrates, nitrites, or carbonates compared to the unreacted aqueous suspension. In some embodiments, the enhanced aqueous suspension is recovered and further processed to separation the liquid fraction from the solid fraction. The solid fraction containing enhanced coal-derived mineral matter particles may be dried.

The aqueous suspension preferably has a pH greater than 7.5. The aqueous suspension typically has a pH in the range of 7.5 to 9.

The aqueous suspension may contain from 0.5 wt. % to 40 wt. % coal-derived mineral matter particles. In a non-limiting embodiment, the aqueous suspension contains from 5 wt. % to 10 wt. % coal-derived mineral matter particles.

The chemical reaction between the combustion gas emissions and the aqueous suspension is a multiphase reaction. The reaction rate may be improved by increasing the reactive surface area between the gaseous and liquid/solid phases. Any known technique of increasing the liquid/gas interface surface area may be used, including mechanically increasing the reactive surface area through the use of surface area enhancing devices, such as bioballs described herein.

A variation of the disclosed method of removing combustion gas emissions from flue gas involves the use of an aqueous suspension of fine coal refuse comprising coal-derived mineral matter particles and fine coal particles. This modified aqueous suspension is contacted with the combustion gas emissions for sufficient time to cause the emissions to react with the aqueous suspension to form an enhanced aqueous suspension in the same manner as disclosed above.

The disclosed invention also includes compositions of matter directed to an aqueous suspension of coal-derived mineral matter particles containing enhanced amounts of soluble and insoluble sulfate, sulfite, nitrate, nitrite, or carbonate reaction compounds formed by reaction of the aqueous suspension of the coal-derived mineral matter particles with combustion gas emissions.

The compositions of matter include the solid and liquid fractions of the enhanced aqueous suspension. Thus, the disclosed invention includes coal-derived mineral matter particles containing enhanced amounts of soluble and insoluble sulfate, sulfite, nitrate, nitrite, or carbonate reaction compounds formed by reaction of an aqueous suspension of the coal-derived mineral matter particles with combustion gas emissions. The disclosed invention also includes the liquid fraction obtained from an aqueous suspension of coal-derived mineral matter particles containing enhanced amounts of soluble and insoluble sulfate, sulfite, nitrate, nitrite, or carbonate reaction compounds formed by reaction of the aqueous suspension of the coal-derived mineral matter particles with combustion gas emissions.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
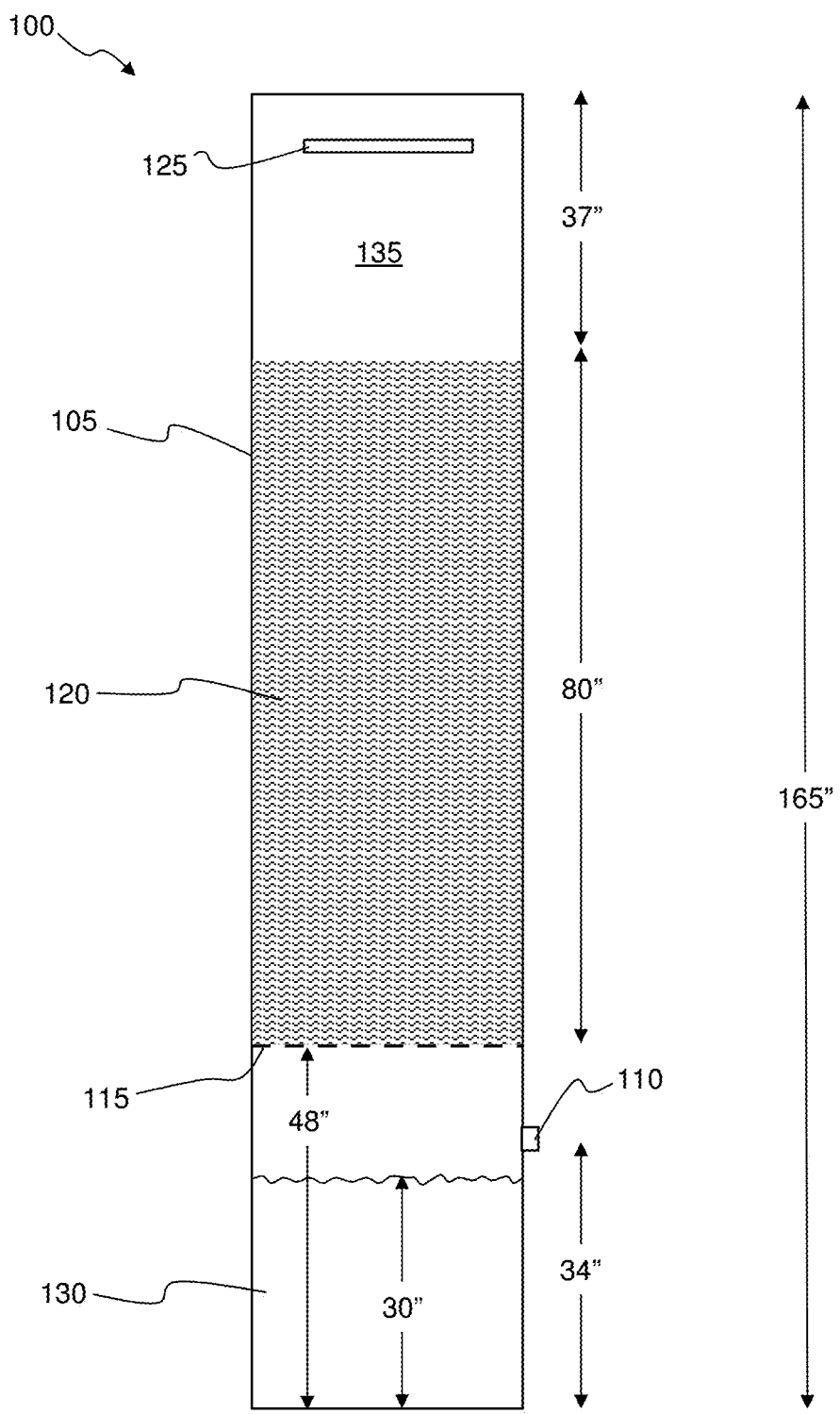
FIG. 1 is a drawing depicting a non-limiting demonstration of the use of the included invention.

The disclosed invention may be understood by reference to the drawing and the following more detailed description of the embodiments of the invention. They are not intended to limit the scope of the invention, but are merely representative of embodiments of the invention.

Coal Refuse

As used herein, the terms "coal refuse" and "fine coal refuse" mean waste material resulting from the mining and screening or processing of coal. The term coal refuse also includes "coal slurry" which is wastewater and impurities produced as the result of coal washing and preparation for market. Collectively, the terms "coal refuse" and "coal slurry" include fine mineral matter that is produced as a waste product in coal mining operations. They may contain a combination of fine coal, oxidized coal, and one or more mineral matter components including, but not limited to, shale, clay, siltstone, sandstone, limestone, or related materials that are excavated, moved, and disposed of from underground workings relating to coal mining operations.

Mineral Matter in Coal

As used herein, the term coal-derived mineral matter includes the mineral matter inherent in coal. It originates from mechanisms or sources associated with ancient plant life that was converted into coal, sediment that was deposited into the peat swamp via wind or water erosion, water solution containing dissolved and suspended minerals which flowed into peat swamp, groundwater containing dissolved and suspended minerals that flowed into seams of coal after formation, gas that diffused into the coal after formation, and/or products from volcanic activity that were deposited in peat swamps. (Coal, Oil Shale, Natural Bitumen, Heavy Oil and Peat, Gao Jinsheng, Ed., Vol. 1, *Mineral Matter in Coal,* 2009, page 172). Mineral matter in coal can be syngenetic, meaning formed at the same time during the accumulation of the plant debris; early diagenetic, meaning formed shortly after being buried by more peat or other sediment; late diagenetic, meaning formed during the processes associated with the deepened buried depth and advanced coalification; or epigenetic, meaning formed after the coal reached its present rank. (Id., p.169).

Plants contain many kinds of inorganic matter including primary and secondary minerals. Such can be syngenetic and maybe early diagenic mineral forms. Id., p. 169. Minerals carried in by water and wind include clay minerals, quartz, apatite, zircon, rutile, feldspar, mica, etc. Such can be early diagenetic, late diagenetic and epigenetic mineral forms. Id., p,169, Aggregates of mineral matter that are relatively large are routinely separated from coal through standard coal preparation processes. The very fine mineral particles found in coal, are very difficult or even impossible to remove through usual large-scale coal preparation processes. The very fine mineral matter in coal is often found embedded in the macerals of the coal. These very fine mineral particles embedded in the macerals are the major source of the mineral matter (ash-forming particles) separated from fine coal particles by froth flotation processes as described in copending U.S. patent application Ser. No. 14/495,657, entitled "FLOTATION SEPARATION OF FINE COAL PARTICLES FROM ASH-FORMING PARTICLES," which application is incorporated by reference. These fine mineral particles were trapped in the coal as fine particles in the macerals during coal formation. Hence they are largely syngenetic or maybe early diagenetic (see Id., p. 169).

Coal-derived mineral matter is known to provide a source of metallic or non-metallic trace elements such as Ge, Ga, Va, Au, Ag, Be, Cu, La, Zn, etc. Coal ash is often used to manufacture bricks and various construction materials and it can partially replace cement in concrete. Id., p. 176.

One aspect of the disclosed invention is the use of the coal-derived mineral matter as a "scrubber" material to selectively remove combustion gas emissions from flue gas.

Another aspect of this invention is to use coal refuse that contains coal derived mineral matter as a "scrubber" material to remove combustion gas emissions from flue gas.

The following example is given to illustrate one non-limiting embodiment showing the use of coal-derived mineral matter to remove combustion gas emissions from flue gas or exhaust gas. It is to be understood that this example is neither comprehensive nor exhaustive of the many types of embodiments which can be practiced in accordance with the presently disclosed invention.

EXAMPLE 1

FIG. 1 illustrates one experimental setup 100 used to demonstrate the effectiveness of the disclosed invention. An 18 inch (0.46 m) diameter by 165 inch (4.2 m) tall column 105 was used. A 3 inch (0.76 m) diameter flue gas inlet pipe 110 was centered at 34 inches (0.86 m) from the bottom of the column. A wire mesh 115 was installed 48 inches (1.22 m) from the bottom of the column. The next 80 inches (2.03 m) of space in the column was filled with 1.25 inch (0.032 m) diameter bioballs 120. Bioballs are commercially available, fluted polymer spheres that serve to dramatically increase surface area within a volume of space. The remaining 37 inches (0.94 m) of column height was empty. A liquid shower manifold 125 was installed at the top of the column to enable the liquid being tested to be introduced into the column. In this example, the liquid included water, water with 8 wt. % solids suspended coal derived mineral matter, and water+0.1M NaOH.

The test liquid 130 filled the first 30 inches of the column. The test liquid was pumped from the bottom of the column and recirculated to the top through the water shower manifold 125 at 37.5 gallons per minute (gpm). The column had a lid with a 1 inch hole in it to create positive pressure when gasses were blown into the column. The residence time of test liquid passing through the 80 inch bed height of bioballs was measured to be 17 seconds. Combustion engine flue gas entered into the column at the flue gas inlet 110 at 13.4 cfm. The flue gas passed upwards through the 80 inch bed of bioballs 120 coming in contact with the test liquid that was recirculated through the column from the top shower manifold 125 at 37.5 gpm. The high surface area of the bioballs filling the 80 inches of column height served to increase residence time of the test liquid in the column which enhances contact or mixing of the flue gas with the counter current flow of test liquid. In essence, a torturous path was created which enhanced reactive contact surface area between the liquid and gaseous phases.

$O_2$, NO, $SO_2$ and $CO_2$ combustion gasses which are part of the typical makeup of the flue gas from the combustion engine were measured using a Bacharach PCA3 meter. $O_2$ was used as the control measurement to indicate when the analyzer reached steady state. For each test, combustion gas was run for 5 minutes to ensure a steady state within the column. A flue gas measurement was taken at the flue gas inlet 110 which represented the flue gas source and from the constant atmosphere in the column in the 37 inches of empty space 135 above the bioballs which represented flue gas that may or may not have had combustion gasses removed based on the treatment of the flue gas.

Three tests were run: water, water with 8 wt. % solids suspended coal derived mineral matter, and water+0.1M NaOH. NaOH is a known reagent in combustion gas scrubbing.

TABLE 1

Test #1 - Water only water at pH of 8.

| Gas | Flue Gas | Treated Flue Gas | % Change |
|---|---|---|---|
| $CO_2$ | 11.4% | 11.7% | 2.6% |
| NO | 33 ppm | 32 ppm | −3.0% |
| $SO_2$ | 209 ppm | 197 ppm | −5.7% |

TABLE 2

Test #2 - water with 8 wt. % solids suspended coal derived mineral matter at pH of 7.

| Gas | Flue Gas (ppm) | Treated Flue Gas | % Change |
|---|---|---|---|
| $CO_2$ | 11.2% | 5.2% | −53.7% |
| $NOx$ | 48.7 ppm | 17.3 ppm | −64.4% |
| $SO_2$ | 285 ppm | 145 ppm | −49.1% |

TABLE 3

Test #3 - water with 0.1M NaOH. pH of 12.

| Gas | Flue Gas | Treated Flue Gas | % Change |
|---|---|---|---|
| $CO_2$ | 11.3% | 11.0% | −2.7% |
| $NOx$ | 35 ppm | 35 ppm | 0.0% |
| $SO_2$ | 224 ppm | 226 ppm | 0.9% |

The data clearly shows that the presence of the coal derive mineral matter in the water reduces the amount of $CO_2$, $NO_x$, and $SO_2$ in the flue gas. The reduction was between about 50% and 60% for all three gasses.

Water from before and after Test 1 was sent out for sulfur, sulfate, nitrogen, nitrate, and nitrite analysis. Clarified water and dry solids from before and after Test 2 were sent out for sulfur, sulfate, nitrogen, nitrate, and nitrite analysis. The results shown in Tables 4, 5, and 6 clearly indicate that the presence of coal derived mineral matter in the water causes a net increase in sulfur and nitrogen containing compounds in the dry solids and in the water after passing the flue gas through the column when coal derived mineral matter was present. These results supports the data above showing that a net reduction in NO and $SO_2$ in the flue gas after passing through the column when coal derived mineral matter was present.

TABLE 4

Water from before and after Test 1
Water

| Test | Before Test #1 mg/ml | After Test #1 mg/ml | % Change |
|---|---|---|---|
| Sulfur | 77.7 | 80.8 | 4.0% |
| Sulfate | 235 | 241 | 2.6% |

TABLE 4-continued

Water from before and after Test 1
Water

| Test | Before Test #1 mg/ml | After Test #1 mg/ml | % Change |
|---|---|---|---|
| Nitrogen | 0.4 | 0.11 | −72.5% |
| Nitrate | ND | 0.011 | |
| Nitrite | ND | ND | |

TABLE 5

Clarified water from before and after Test 2
Clarified Water

| Test | Before Test #2 mg/ml | After Test #2 mg/ml | % Change |
|---|---|---|---|
| Sulfur | 20.4 | 73.7 | 261.3% |
| Sulfate | 61.9 | 201 | 224.7% |
| Nitrogen | 0.44 | 0.74 | 68.2% |
| Nitrate | ND | ND | |
| Nitrite | ND | 0.09 | |

TABLE 6

Dry solids from before and after Test 2
Dry Solids

| Test | Before Test #2 mg/kg | After Test #2 mg/kg | % change |
|---|---|---|---|
| Sulfur | 798 | 708 | −11.3% |
| Sulfate | 618 | 988 | 59.9% |
| Nitrogen | 2310 | 2110 | −8.7% |
| Nitrate | 0.853 | ND | −100.0% |
| Nitrite | 10.9 | 11.4 | 4.6% |

Another aspect of the disclosed invention is the used of the enhanced water and mineral matter following treatment of the flue gas. Since some of the sulfur, nitrogen, and carbonate salts remain as ions in the spent water, the water containing the captured compounds and salts from the flue gas combined with the solid mineral matter may be used as nutrients and/or fertilizer enhancements to provide soil texture and mineral nutrient benefits.

One reason Test #2 uses water with 8 wt. % solids suspended coal-derived mineral matter is because that is a projected concentration coming out of a flotation cell, such as disclosed in U.S. patent application Ser. No. 14/495,657 after separating the fine coal particles from the fine mineral matter particles. The actual flow rate used to treat combustion flue gas may vary. The flow rate may be adjusted by cycling water and mineral matter particles through the system one or more times.

The maximum concentration of coal-derived mineral matter particles in water is limited by the ease of pumping and flow over the bioballs without clogging them. It is presently believed higher concentration of fine mineral matter removes more combustion gas emissions.

Figure 2:
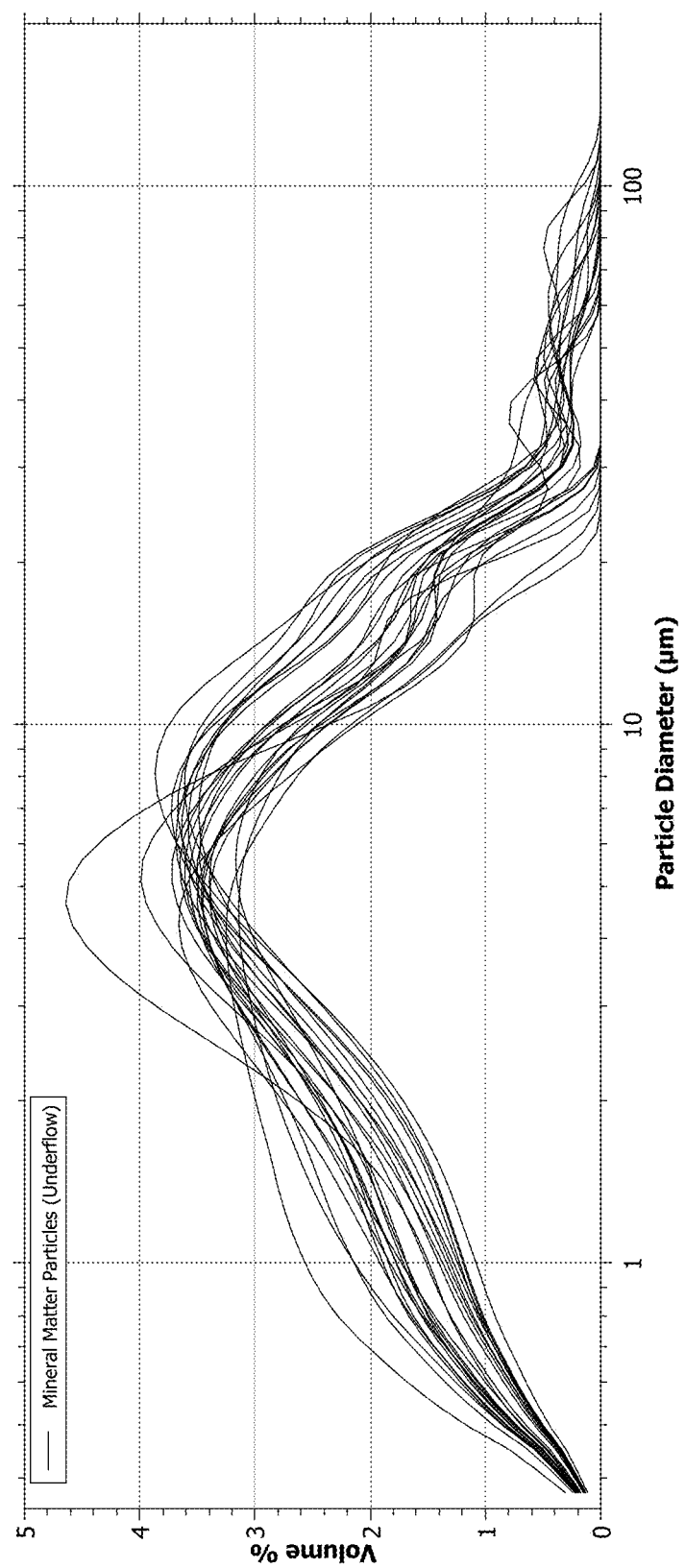
FIG. 2 is a graph of the particle size distribution for twenty-six samples from different coal refuse sites of fine particles of the coal-derived mineral matter separated from fine coal refuse by flotation separation and recovered in the tailings or underflow.

FIG. 2 is a graph of the particle size distribution for twenty-six coal-derived fine mineral matter samples obtained by flotation separation of fine coal refuse from twenty-six different refuse sites. Table 7 shows the average and median particle sizes for these same coal-derived mineral matter samples. In FIG. 2, all samples showed very similar particle size distribution, with most particles having a size less than 100 µm. Discounting the peaks at about 50 to 100 µm which are associated with coal particles in the tailings, the tailings particle size distributions show main peaks between 6 and 9 µm for all the samples. The peaks end or reach the baseline at about 30 µm, meaning that the mineral matter particles in the tailings are typically smaller than 30 µm. Table 7 shows that the average particle sizes are less than 10 µm and the median particle sizes are less than about 6.5 µm for all 26 samples.

TABLE 7

Mean and median particle size of coal-derived mineral matter separated from coal matter by flotation separation.

| Sample # | Particle Size (µm) | |
| --- | --- | --- |
| | Mean | Median |
| C028 | 6.2 | 4.5 |
| C035 | 7.9 | 4.4 |
| C055 | 5.7 | 4.3 |
| C056 | 5.8 | 3.7 |
| C057 | 5.3 | 3.7 |
| C060 | 9.3 | 6.0 |
| C074 | 7.2 | 4.3 |
| C080 | 5.9 | 4.1 |
| C082 | 9.8 | 4.8 |
| C093 | 5.0 | 4.1 |
| C126 | 8.6 | 6.0 |
| C128 | 9.3 | 6.3 |
| C131 | 3.0 | 1.5 |
| C146 | 8.4 | 6.6 |
| C148 | 5.8 | 4.2 |
| C156 | 7.5 | 4.2 |
| C157 | 7.7 | 4.3 |
| C158 | 8.6 | 4.9 |
| C172 | 10.0 | 5.3 |
| C178 | 8.0 | 5.4 |
| C185 | 6.6 | 3.8 |
| C186 | 8.2 | 5.1 |
| C187 | 8.8 | 5.9 |
| C188 | 7.7 | 5.4 |
| C189 | 8.3 | 5.6 |
| C200 | 9.1 | 6.5 |

EXAMPLE 2

Figure 3:
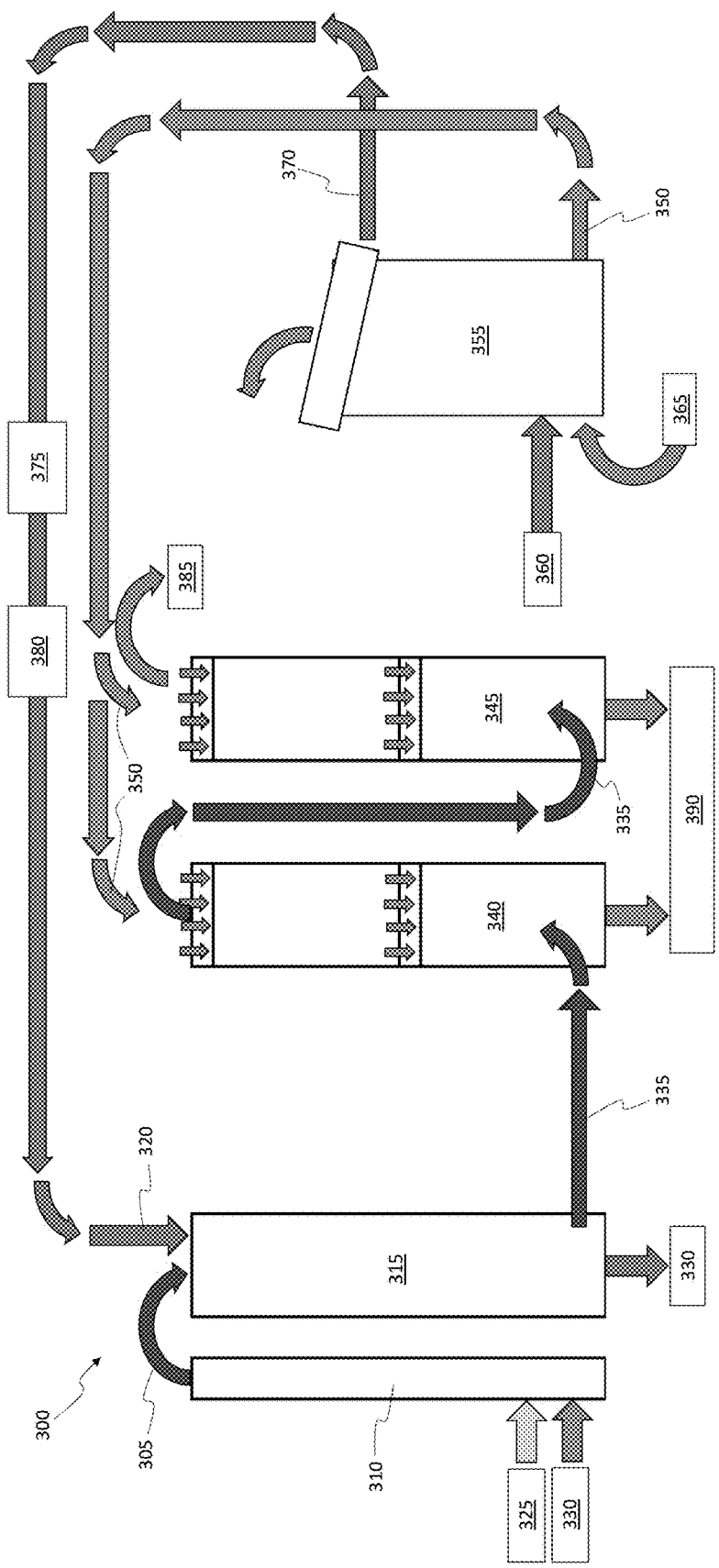
FIG. 3 is a schematic of a process that uses coal derived mineral matter to remove combustion gas emissions in a flue gas produced by a combustor unit in a process that dries coal pellets.

FIG. 3 is a schematic 300 showing one manner in which coal derived mineral matter (CDMM) may be used to remove combustion gas emissions in a flue gas produced by a process that dries coal pellets. The hot flue gas 305 containing combustion gas emissions from a combustor unit 310 passes through the thermal reactor 315 in a co-flow direction with coal pellets 320 to thermally remove water from the coal pellets. Fuel 325 and air 330 are introduced into the combustor unit and combusted to form the hot flue gas 305 containing combustion gas emissions. Within the thermal reactor 315, the temperature of the hot flue gas quickly falls to about 100° C. as water is converted from a liquid phase in the coal pellets to a vapor phase and transported away from the pellets with the flow of flue gas through the coal pellets. Dried coal pellets 330 are discharged at the bottom of the thermal reactor 315.

Moist flue gas 335 from the thermal reactor 315 is ducted into the bottom of one or more coal derived mineral matter reactors (CDMMR) 340, 345. A coal derived mineral matter slurry (CDMMS) 350 (also referred to herein as an aqueous suspension), consisting of water and about 8 wt. % dispersed coal derived mineral matter that was produced in a flotation cell 355, is pumped into the top of the coal derived mineral matter reactors (CDMMR) 340, 345. The CDMMR may have a configuration similar to the structure shown in FIG. 1.

The flotation cell 355 may be any known or novel flotation cell. Examples of suitable flotation cells are disclosed in copending U.S. patent application Ser. No. 14/495,657. A raw slurry of fine coal particles 360 is introduced into the flotation cell 355 and floated by a source of process air 365. The coal froth 370 is recovered at the top of the flotation cell 355. The coal froth may be mechanically dewatered 375 and pelletized 380 to form coal pellets 320.

The moist flue gas 335 flows upward through each CDMMR 340, 345 while CDMMS 350 flows downward. Mechanical surface area enhancing structures in the CDMMR increase the surface area and maximize contact between the downward flowing CDMMS 350 aqueous suspension and the combustion gas emissions in the upward moist flowing flue gas 335. Non-limiting examples of mechanical surface area enhancing structures include fluted balls, such as bioballs discussed in Example 1. Generating bubbles of the flue gas is another way to increase the surface contact area between the flue gas and the CDMMS aqueous suspension. Combustion gas emissions, such as NOx, SOx, and CO react with and are captured by the CDMMS. The processed gas 385 is vented out the top of the coal derived mineral matter reactor 345.

While passing through the coal derived mineral matter reactors 340 and 345, the coal derived mineral matter slurry 350 contacts the combustion gas emissions in the flue gas 335 and reacts to produce an increased amount of soluble and insoluble sulfates, sulfites, nitrates, nitrites, or carbonates compared to the unreacted aqueous suspension 350. These reaction products enhance the composition of the coal derived mineral matter slurry. The enhanced coal derived mineral matter slurry 390 may be recovered and dewatered, pelletized, and dried. One non-limiting use of the liquid fraction of the enhanced coal derived mineral matter slurry is as a liquid fertilizer. One non-limiting use of the solid fraction is as a soil conditioner or additive.

The foregoing in one example process showing the use of a coal derived mineral matter slurry (CDMMS) to remove combustion gas emissions and particulate matter from flue gas. CDMMS could remove combustion gasses and particulate matter from any number of combustor systems, such as industrial boilers, coal fired power plants, etc.

EXAMPLE 3

This example will illustrate chemical pathways for conversion of SOx, NOx, and CO to soluble and insoluble sulfate, nitrate, and carbonate ionic salts. Similarly, sulfite and nitrite ionic salts can also form. In the example reaction pathways, metal oxides and metal carbonates are the reactant with the gas species to convert them to ionic salts that remain either in the coal derived mineral matter dried particulate solids or the clarified water. Metal oxides can also act as reactants along with SOx, NOx, and CO to convert them to soluble and insoluble ionic salts.

The following are example SOx reactions to form sulfate ion, $SO_4^{2-}$ ion (soluble sulfate salts).

$$SO_{2(g)} + 1/2 O_{2(g)} \rightarrow SO_{3(g)}$$

$$SO_{3(g)} + MCO_{3(sol)} \rightarrow MSO_{4(sol)} + CO_{2(g)}$$

or $$SO_{3(g)} + MO_{(sol)} \rightarrow MSO_{4(sol)} + O_{2(g)}$$

Where M=Cationic metal ($Ca^{2+}$, $K^+$, $Mg^{2+}$, $Fe^{2+/3+}$, etc.); MO=Metal oxide; $SO_4^{2-}$=Sulfate ion; (g)=gas; (sol)=in solution. It is understood that the stoichiometry of the foregoing reactions will vary depending upon the valence of the cationic metal M. The $CO_2$ product can participate in a similar chemical pathway discussed below to produce carbonates. In like manner, some of the $CO_2$ in the combustion gas emissions can react to produce carbonates as well.

The following are example NOx oxidation reactions that may occur to form nitrate ion, $NO_3^-$ ion (soluble nitrate salts).

$$NO + 1/2 O_2 \rightarrow NO_2$$

$$2NO_2 + MCO_3 + 1/2 O_2 \rightarrow M^+(NO_3)^{-2} + CO_2$$

or $$2NO_2 + MO + 1/2 O_2 \rightarrow M^+(NO_3)^{-2}$$

Where M=Cationic metal ($Ca^{2+}$, $K^+$, $Mg^{2+}$, $Fe^{2+/3+}$, etc.); MO=Metal oxide; $NO_3^-$=Nitrate ion; (g)=gas; (sol)=in solution. It is understood that the stoichiometry of the foregoing reactions will vary depending upon the valence of the cationic metal M.

The following are example NOx reduction reactions that may occur to form nitrogen and carbon dioxide.

$$NO_2 + CO \rightarrow NO + CO_2$$

$$2NO + 2CO \rightarrow N_2 + 2CO_2$$

CO reacts in basic solutions to form $CO_3^{2-}$. The following are example CO reactions to form carbonate ion, $CO_3^{2-}$ ion (carbonate salts).

$$CO + 2OH \rightarrow H_2CO_3 \text{ (carbonic acid)}$$

$$CO_2 + H_2O \rightarrow H_2CO_3$$

The hydration of carbon monoxide is slow to attain equilibrium below pH 8 in pure systems. However, above pH 11, the hydration reaction is relatively rapid as carbon monoxide reacts directly with hydroxide to form bicarbonate.

$$H_2CO_3 + Ca(OH)_2 = CaCO_3 \text{ (insoluble at pH>7)}$$

$$H_2CO_3 + MOH = MCO_3$$

Where MOH=metal hydroxide.

EXAMPLE 4

Coal derived mineral matter from four different coal source locations were analyzed by X-ray florescence (XRF). XRF is a non-invasive analytical process for mineral characterization. The XRF data show the presence of various metal oxides that can participate in reaction pathways to convert SOx, NOx, and CO to ionic salts and other reaction products discussed above.

TABLE 8

XRF of Coal Derived Mineral Matter - Sample 1

| | Wt % | ppm |
|---|---|---|
| Mineral Oxide | | |
| $Fe_2O_3$ | 4.62 | 46200 |
| MgO | 1.91 | 19100 |
| CaO | 1.13 | 11300 |
| $K_2O$ | 4.43 | 44300 |
| $MnO_2$ | 0.04 | 400 |
| $Na_2O$ | 0.35 | 3500 |
| BaO | 0.11 | 1100 |
| Sum Cations | 12.59 | 125900 |
| Anion Analysis | | |
| S | 0.29 | 2900 |
| Cl | 0.02 | 200 |
| $P_2O_5$ | 0.08 | 800 |
| Sum anions | 0.39 | 3900 |
| Sum Total | 12.98 | 129800 |

TABLE 9

XRF of Coal Derived Mineral Matter - Sample 2

| | Wt % | ppm |
|---|---|---|
| Mineral Oxide | | |
| $Fe_2O_3$ | 6.07 | 60700 |
| MgO | 1.47 | 14700 |
| CaO | 2.75 | 27500 |
| $K_2O$ | 3.93 | 39300 |
| $MnO_2$ | | |
| $Na_2O$ | 0.31 | 3100 |
| BaO | 0.19 | 1900 |
| Sum Cations | 14.72 | 147200 |
| Anion Analysis | | |
| S | 0.14 | 1400 |
| Cl | 0.02 | 200 |
| $P_2O_5$ | 0.06 | 600 |
| Sum anions | 0.22 | 2200 |
| Sum Total | 14.94 | 149400 |

TABLE 10

XRF of Coal Derived Mineral Matter - Sample 3

| | Wt % | ppm |
|---|---|---|
| Mineral Oxide | | |
| $Fe_2O_3$ | 7.58 | 75800 |
| MgO | 0.28 | 2800 |
| CaO | 0.37 | 3700 |

TABLE 10-continued

XRF of Coal Derived Mineral Matter - Sample 3

|  | Wt % | ppm |
|---|---|---|
| $K_2O$ | 4.51 | 45100 |
| $MnO_2$ | | |
| $Na_2O$ | 0.28 | 2800 |
| BaO | 0.1 | 1000 |
| Sum Cations | 13.12 | 131200 |
| Anion Analysis | | |
| S | 0.1 | 1000 |
| Cl | 0.02 | 200 |
| $P_2O_5$ | 0.1 | 1000 |
| Sum anions | 0.22 | 2200 |
| Sum Total | 2.89 | 133400 |

TABLE 11

XRF of Coal Derived Mineral Matter - Sample 4

|  | Wt % | ppm |
|---|---|---|
| Mineral Oxide | | |
| $Fe_2O_3$ | 4.62 | 46200 |
| MgO | 0.25 | 2500 |
| CaO | 0.41 | 4100 |
| $K_2O$ | 3.88 | 38800 |
| $MnO_2$ | | |
| $Na_2O$ | 0.25 | 2500 |
| BaO | 0.08 | 800 |
| Sum Cations | 9.49 | 94900 |
| Anion Analysis | | |
| S | 0.17 | 1700 |
| Cl | 0.02 | 200 |
| $P_2O_5$ | 0.05 | 500 |
| Sum anions | 0.24 | 2400 |
| Sum Total | 9.73 | 97300 |

The described embodiments and examples are all to be considered in every respect as illustrative only, and not as being restrictive. The scope of the invention is, therefore, indicated by the appended claims, rather than by the foregoing description. All changes that come within the meaning and range of equivalency of the claims are to be embraced within their scope.

The invention claimed is:

1. A method of removing combustion gas emissions from flue gas comprising:
   obtaining an aqueous suspension of coal-derived mineral matter particles separated from non-combusted coal; and
   contacting the combustion gas emissions with the aqueous suspension for sufficient time to cause the emissions to react with the aqueous suspension to form an enhanced aqueous suspension.

2. The method according to claim 1, wherein the combustion gas emissions comprise NOx, and wherein the NOx reacts with the aqueous suspension.

3. The method according to claim 1, wherein the combustion gas emissions comprise SOx, and wherein the SOx reacts with the aqueous suspension.

4. The method according to claim 1, wherein the combustion gas emissions comprise CO, and wherein the CO reacts with the aqueous suspension.

5. The method according to claim 1, wherein the combustion gas emissions comprise NOx, SOx, CO, or mixtures thereof, and wherein the NOx, SOx, CO, or mixtures thereof react with the aqueous suspension to produce an increased amount of soluble and insoluble sulfates, sulfites, nitrates, nitrites, or carbonates in the enhanced aqueous suspension compared to the unreacted aqueous suspension.

6. The method according to claim 1, wherein the aqueous suspension has a pH greater than 7.5.

7. The method according to claim 1, wherein the aqueous suspension comprises from 0.5 wt. % to 40 wt. % coal-derived mineral matter particles.

8. The method according to claim 1, wherein the aqueous suspension comprises from 5 wt. % to 10 wt. % coal-derived mineral matter particles.

9. The method according to claim 1, further comprising the step of recovering the enhanced aqueous suspension.

10. The method according to claim 9, wherein the enhanced aqueous suspension comprises an increased amount of soluble and insoluble sulfates, sulfites, nitrates, nitrites, or carbonates compared to the unreacted aqueous suspension.

11. The method according to claim 10, further comprising separating a solid fraction and a liquid fraction of the enhanced aqueous suspension.

12. The method according to claim 11, wherein the solid fraction comprises enhanced coal-derived mineral matter particles and wherein the method further comprises drying the enhanced coal-derived mineral matter particles.

13. The method according to claim 1, further comprising the step of mechanically increasing a reactive surface area between the combustion gas emissions and the aqueous suspension.

14. A method of removing combustion gas emissions from flue gas comprising:
   obtaining an aqueous suspension of fine coal refuse comprising coal-derived mineral matter particles and non-combusted fine coal particles; and
   contacting the combustion gas emissions with the aqueous suspension for sufficient time to cause the emissions to react with the aqueous suspension to form an enhanced aqueous suspension.

15. The method according to claim 14, wherein the combustion gas emissions comprise NOx, SOx, CO, or mixtures thereof, and wherein the NOx, SOx, CO, or mixtures thereof react with the aqueous suspension to produce an increased amount of soluble and insoluble sulfates, sulfites, nitrates, nitrites, or carbonates in the enhanced aqueous suspension compared to the unreacted aqueous suspension.

16. The method according to claim 14, wherein the aqueous suspension has a pH greater than 7.5.

17. The method according to claim 14, wherein the aqueous suspension comprises from 0.5 wt. % to 40 wt. % coal-derived mineral matter particles.

18. An aqueous suspension of coal-derived mineral matter particles separated from non-combusted coal comprising enhanced amounts of soluble and insoluble sulfate, sulfite, nitrate, nitrite, or carbonate reaction compounds formed by reaction of the aqueous suspension of the coal-derived mineral matter particles with combustion gas emissions.

19. Coal-derived mineral matter particles separated from non-combusted coal comprising enhanced amounts of soluble and insoluble sulfate, sulfite, nitrate, nitrite, or carbonate reaction compounds formed by reaction of an aqueous suspension of the coal-derived mineral matter particles with combustion gas emissions.

20. A liquid fraction obtained from an aqueous suspension of coal-derived mineral matter particles separated from non-combusted coal comprising enhanced amounts of soluble and insoluble sulfate, sulfite, nitrate, nitrite, or carbonate reaction compounds formed by reaction of the aqueous suspension of the coal-derived mineral matter particles with combustion gas emissions.

* * * * *